United States Patent [19]

Okunoki

[11] Patent Number: 5,686,914
[45] Date of Patent: Nov. 11, 1997

[54] INFORMATION PROCESSING SYSTEM

[75] Inventor: Yutaka Okunoki, Tokyo, Japan

[73] Assignee: Sega Enterprises, Ltd., Tokyo, Japan

[21] Appl. No.: 424,297

[22] PCT Filed: Oct. 28, 1993

[86] PCT No.: PCT/JP93/01554

§ 371 Date: Jul. 10, 1995

§ 102(e) Date: Jul. 10, 1995

[87] PCT Pub. No.: WO94/10685

PCT Pub. Date: May 11, 1994

[30] Foreign Application Priority Data

Oct. 30, 1992 [JP] Japan .................................. 4-315748

[51] Int. Cl.$^6$ ........................................................ H03M 7/46
[52] U.S. Cl. ............................................................... 341/59
[58] Field of Search ............................... 341/59, 65, 106; 395/800; 364/410; 463/24, 29, 43, 44

[56] References Cited

U.S. PATENT DOCUMENTS

| Re. 34,161 | 1/1993 | Nakagawa et al. . |
| 4,485,457 | 11/1984 | Balaska et al. . |
| 4,591,829 | 5/1986 | Takeda . |
| 4,799,635 | 1/1989 | Nakagawa . |
| 4,844,632 | 7/1989 | Lee et al. . |
| 4,865,321 | 9/1989 | Nakagawa et al. . |
| 5,014,982 | 5/1991 | Okada et al. . |
| 5,070,479 | 12/1991 | Nakagawa . |
| 5,349,689 | 9/1994 | Suzuki ............................... 395/800 |
| 5,357,604 | 10/1994 | San et al. . |

FOREIGN PATENT DOCUMENTS

| 246025 | 11/1987 | European Pat. Off. . |
| 367426 | 5/1990 | European Pat. Off. . |
| 4222997 | 8/1992 | Japan . |
| 4284551 | 10/1992 | Japan . |

Primary Examiner—Brian K. Young
Attorney, Agent, or Firm—Price, Gess & Ubell

[57] ABSTRACT

An information processing system has an arithmetic processing unit and an external memory storage detachably connected to the arithmetic processing unit and, further has the shared data processing function. Further, the information processing system determines an authenticity of the external memory storage without providing any specific processing device. Furthermore, the information processing system has the external memory storage and an arithmetic processing unit, wherein the external storage unit is detachably connected to the arithmetic processing unit, and further has a processing means for processing for the data stored in the external storage unit, having a first processing means provided to the external storage unit and a second processing means provided to the arithmetic processing unit for sharing the function for processing the data.

28 Claims, 20 Drawing Sheets

BLOCK DIAGRAM SHOWING THE STRUCTURE OF
THE FIRST EMBODIMENT ACCORDING TO
THE PRESENT INVENTION

FIG. 2

ONE EXAMPLE OF RUN LENGTH CODING

ORIGINAL BINARY DATA 11101110111011101110100110011001100110010011001100010001 (BINARY) → 56 BITS
HEXADECIMAL DATA    E E E E 9 9 9 9 3 3 1 1
RUN LENGTH CODED DATA    E 4 9 4 3 1 1

FIG. 3

ONE EXAMPLE OF HUFFMAN'S CODING

| ORIGINAL DATA | HUFFMAN'S CODE FOR RUN DATA | HUFFMAN'S CODE FOR RUN LENGTH |
|---|---|---|
| 0 | 0 0 | 0 0 |
| 1 | 0 1 | 0 1 |
| 2 | 1 0 | 1 0 0 0 |
| 3 | 1 1 0 0 0 | 1 0 0 1 |
| 4 | 1 1 0 0 1 | 1 0 1 0 |
| 5 | 1 1 0 1 0 | 1 0 1 1 |
| 6 | 1 1 0 1 1 | 1 1 0 0 |
| 7 | 1 1 1 0 0 | 1 1 0 1 |
| 8 | 1 1 1 0 1 | 1 1 1 0 |
| 9 | 1 1 1 1 0 | 1 1 1 1 0 0 |
| A | 1 1 1 1 0 0 | 1 1 1 1 0 1 |
| B | 1 1 1 1 0 1 | 1 1 1 1 1 0 |
| C | 1 1 1 1 1 0 0 | 1 1 1 1 1 0 0 |
| D | 1 1 1 1 1 0 1 | 1 1 1 1 1 0 1 |
| E | 1 1 1 1 1 1 0 | 1 1 1 1 1 1 0 |
| F | 1 1 1 1 1 1 1 | 1 1 1 1 1 1 1 |

FIG. 4

HUFFMAN'S DECODED TABLE FOR RUN DATA

| HUFFMAN'S CODE | DECODING | CODE LENGTH -1 |
|---|---|---|
| 0 0 | 1 | 1 |
| 0 1 | 1 | 1 |
| 1 0 | 2 | 1 |
| 1 1 0 0 0 | 3 | 4 |
| 1 1 0 0 1 | 4 | 4 |
| 1 1 0 1 0 | 5 | 4 |
| 1 1 0 1 1 | 6 | 4 |
| 1 1 1 0 0 | 7 | 4 |
| 1 1 1 0 1 | 8 | 4 |
| 1 1 1 1 0 | 9 | 4 |
| 1 1 1 1 1 0 0 | A | 6 |
| 1 1 1 1 1 0 1 | B | 6 |
| 1 1 1 1 1 1 0 0 | C | 7 |
| 1 1 1 1 1 1 0 1 | D | 7 |
| 1 1 1 1 1 1 1 0 | E | 7 |
| 1 1 1 1 1 1 1 1 | F | 7 |

7 6 5 4 3 2 1 0

HUFFMAN'S CODE
HUF 7~0

DECODED DATA
DATA 3~0

HUFFMAN'S CODE LENGTH
CLEN 2~0

FIG. 5

HUFFMAN'S DECODED TABLE FOR RUN LENGTH

| HUFFMAN'S CODE | DECODING | CODE LENGTH -1 |
|---|---|---|
| 0 0 | 0 | 1 |
| 0 1 | 1 | 1 |
| 1 0 0 0 | 2 | 3 |
| 1 0 0 1 | 3 | 3 |
| 1 0 1 0 | 4 | 3 |
| 1 0 1 1 | 5 | 3 |
| 1 1 0 0 | 6 | 3 |
| 1 1 0 1 | 7 | 3 |
| 1 1 1 0 | 8 | 3 |
| 1 1 1 0 0 | 9 | 5 |
| 1 1 1 1 0 1 | A | 5 |
| 1 1 1 1 1 0 | B | 5 |
| 1 1 1 1 1 0 0 | C | 7 |
| 1 1 1 1 1 0 1 | D | 7 |
| 1 1 1 1 1 1 0 | E | 7 |
| 1 1 1 1 1 1 1 | F | 7 |

7 6 5 4 3 2 1 0

HUFFMAN'S CODE    DECODED DATA    HUFFMAN'S CODE LENGTH
HUF7~0            DATA3~0         CLEN2~0

BLOCK DIAGRAM SHOWING
THE SECOND EMBODIMENT OF
THE PRESENT INVENTION

INFORMATION PROCESSING SYSTEM

BACKGROUND OF THE INVENTION

1. Field of the Invention

The present invention relates to an information processing system. More particularly, it relates to an information processing system having an arithmetic processing unit and an external memory storage detachably connected to the arithmetic processing unit, and further, having a structure in which the function for processing the data is shared.

2. Description of the Prior Art

A various kinds of systems executing a program, which is stored in an external memory storage, by an arithmetic processing unit are proposed up to now as an information processing system constituted of the arithmetic processing unit and the external memory storage detachably connected to the arithmetic processing unit.

There is, for example, game equipment using a computer, as one example of such as an information processing system. Such game equipment is so constituted that an external memory storage having a built-in storage medium, for example, ROM cartridge, ROM card, CD-ROM and magnetic disk (FD) is detachably connected to the game equipment, in which a built-in computer (CPU) is provided.

It is also constituted so as that the game is executed by reading out the data stored in the external memory storage and performing the arithmetic processing on the read out data in the game equipment and the content of the game program is displayed on a display unit, such as a CRT or liquid crystal display device.

Meanwhile, in the external memory storage, the capacity of memory of the storage medium is limited, because of the package size of the cassette, the standard, the price, and the like. Thus, a data compression method, which decodes and stores the data, is used to make possible to store a large amount of data in the limited storage medium.

Accordingly, it is required for making possible to read out a program data from the external memory storage and perform arithmetic processing on the program data with a CPU provided in the game equipment so that the coded and compressed data is decoded to the original data.

As the method of decoding data, it is considered to use a software program or an exclusive semiconductor chip for decoding and the like.

There is no need to use a special hardware, in the case where the decoding processing is performed by using the software program. It has a merit that the coding method for the data compression can be freely performed. However, there is a problem that the speed for decoding is slow and the CPU in the game equipment is occupied for the decoding processing.

On the other hand, in the case where the decoding processing is performed by using the exclusive semiconductor chip, the speed for decoding is fast, and the problem such that the CPU in the game equipment is occupied is not so critical. More particularly, as the process is complex and the high-speed processing is required, in the case where the image data is decoded, it is effective to perform the processing by using the exclusive semiconductor chip.

In the prior art, it is general to provide the above-described exclusive semiconductor chip for decoding processing only in the game equipment for arithmetic processing to be used commonly for plural external memory storages which are detachably exchanged, because the cost of the semiconductor chip is not cheap.

On the other hand, the storage medium, such as ROM cartridge, ROM card, CD-ROM and FD, is easily reproduced when the program which is a storage data is copied. Thus, it is further required to provide a processing chip for security to prevent the program from being copied without permission.

There is a prior art, for example, described in Japanese laid-open patent publication No. 296433/1986 and No. 3331/1987, and the counter part U.S. Pat. Nos. 4799635, 4865321, 5070479 and R34161, as a conventional system in which the processing chip for security is provided.

In the conventional system, it is constituted so as to provide the processing chips for security are provided in the game equipment and the external storage, respectively, and examined the authenticity of the external memory storage connected to the game equipment by judging whether the results of processing with the both processing chips for security are identical or not.

However, both of these processing chips for security and the exclusive semiconductor chip for decoding cost too much, similarly, so that the external memory storage becomes expensive.

SUMMARY OF THE INVENTION

It is therefore an object of the present invention to provide an information processing system having a function of the data processing, which has an arithmetic processing unit and an external memory storage detachably connected to the arithmetic processing unit, and makes possible to reduce the cost of the system.

It is a still further object of the present invention to provide an information processing system having a structure in which the function for decoding the compressed data is shared to the arithmetic processing unit and the external memory storage.

It is a more further object of the present invention to provide an information processing system which performs examining the authenticity of the external memory storage, without providing any specific processing chip.

A more object of the present invention is to provide an information processing system comprising: an arithmetic processing unit, an external memory storage for storing data, which are detachably connected to the arithmetic processing unit, and a data processing means for performing the processing for the data stored in the external memory storage, having a first processing means provided on the external memory storage and a second processing means provided to the arithmetic processing unit, the first processing and the second processing means performing processing for the data stored in the external memory storage by sharing the processing.

A further object of the present invention is to provide an external memory storage corresponding to the above-described purpose.

A still further object of the present invention is to provide an external memory storage having a storage medium and a processing means for performing, at least, a part of processing function for data stored in the storage medium, which are detachably connected to an arithmetic processing unit having a CPU taking the result of processing the data.

The other objects of the present invention will be understood by the detail description to follow and in conjunction with the appended claims.

BRIEF DESCRIPTION OF THE DRAWINGS

The following drawings are prepared for understanding the present invention. Accordingly, the present invention is not restricted to those embodiments described in the drawings.

FIG. 2 is a diagram showing one example of the run length coding according to the embodiment of the present invention.

FIG. 3 is a diagram showing one example of the Huffman's coding according to the embodiment of the present invention.

FIG. 4 is an explanatory diagram showing the Huffman's decoding table according to the embodiment of the present invention.

FIG. 5 is an explanatory diagram showing the Huffman's decoding table for run length according to the embodiment of the present invention.

Figure 1:
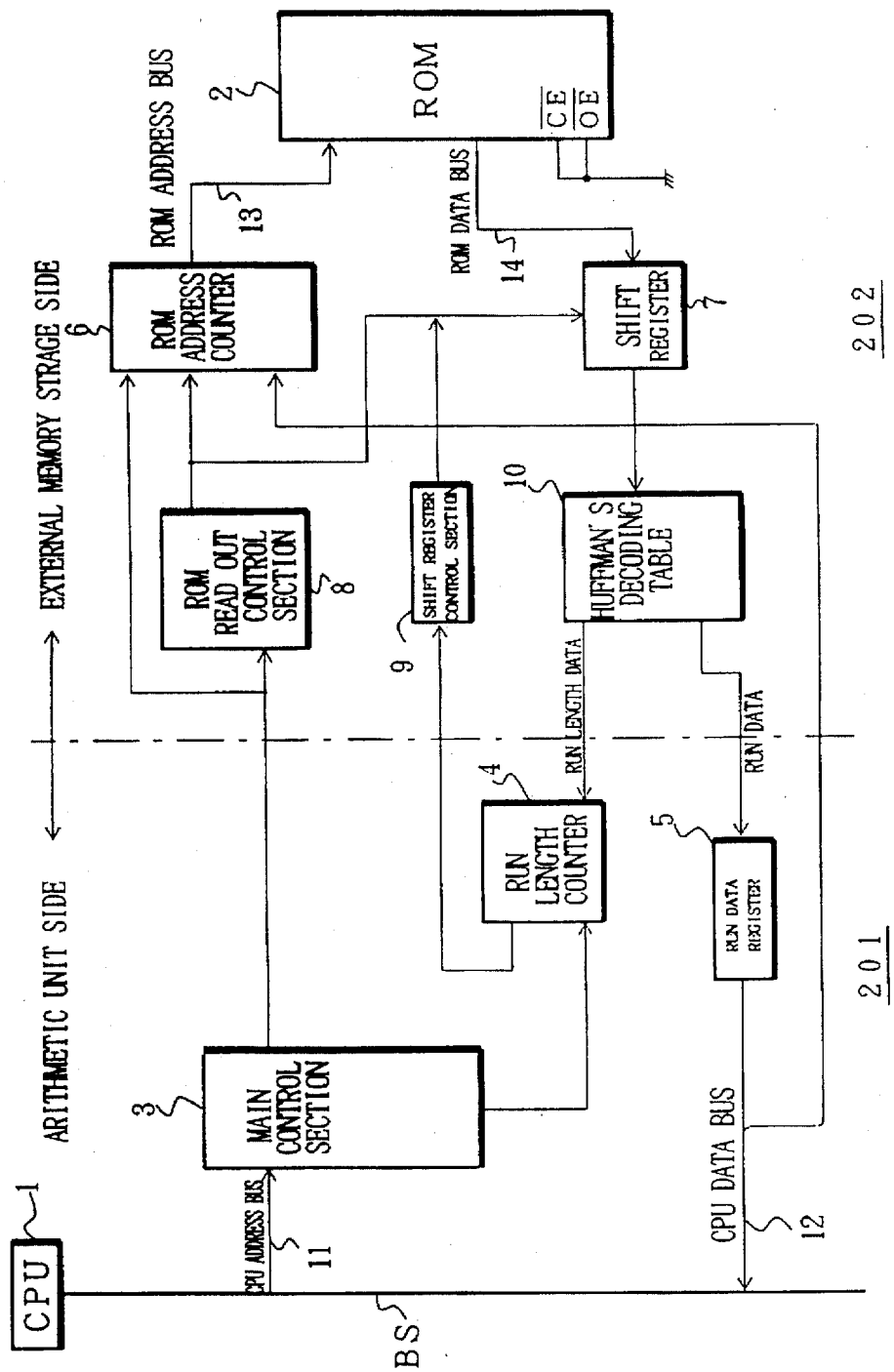
FIG. 1 is a block diagram showing the structure of a first embodiment according to the present invention.

Each of FIGS. 6 through 14 are diagrams showing the circuit by dividing the detailed structure of the block diagram of the first embodiment of FIG. 1.

Figure 13:
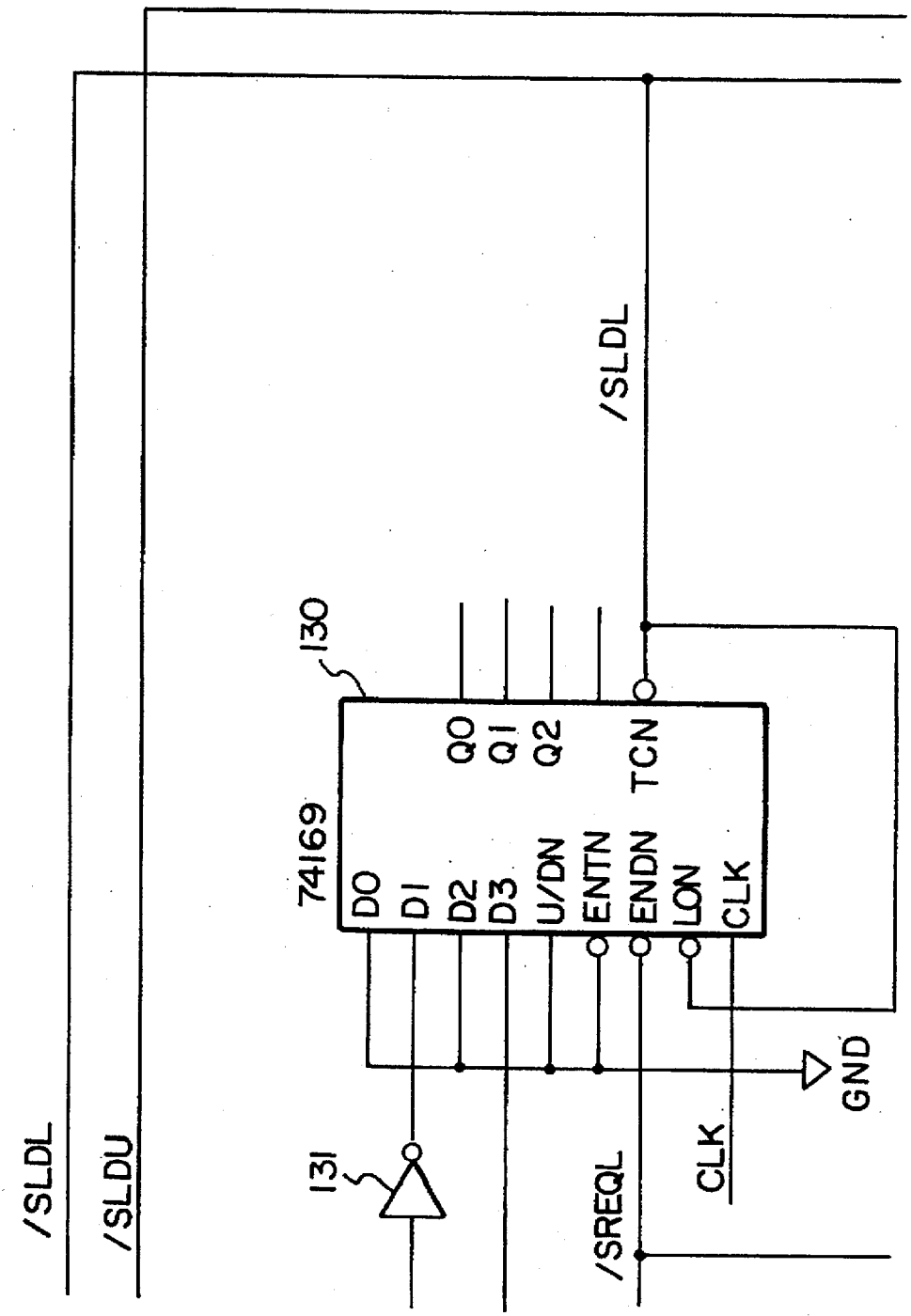
Figure 14:
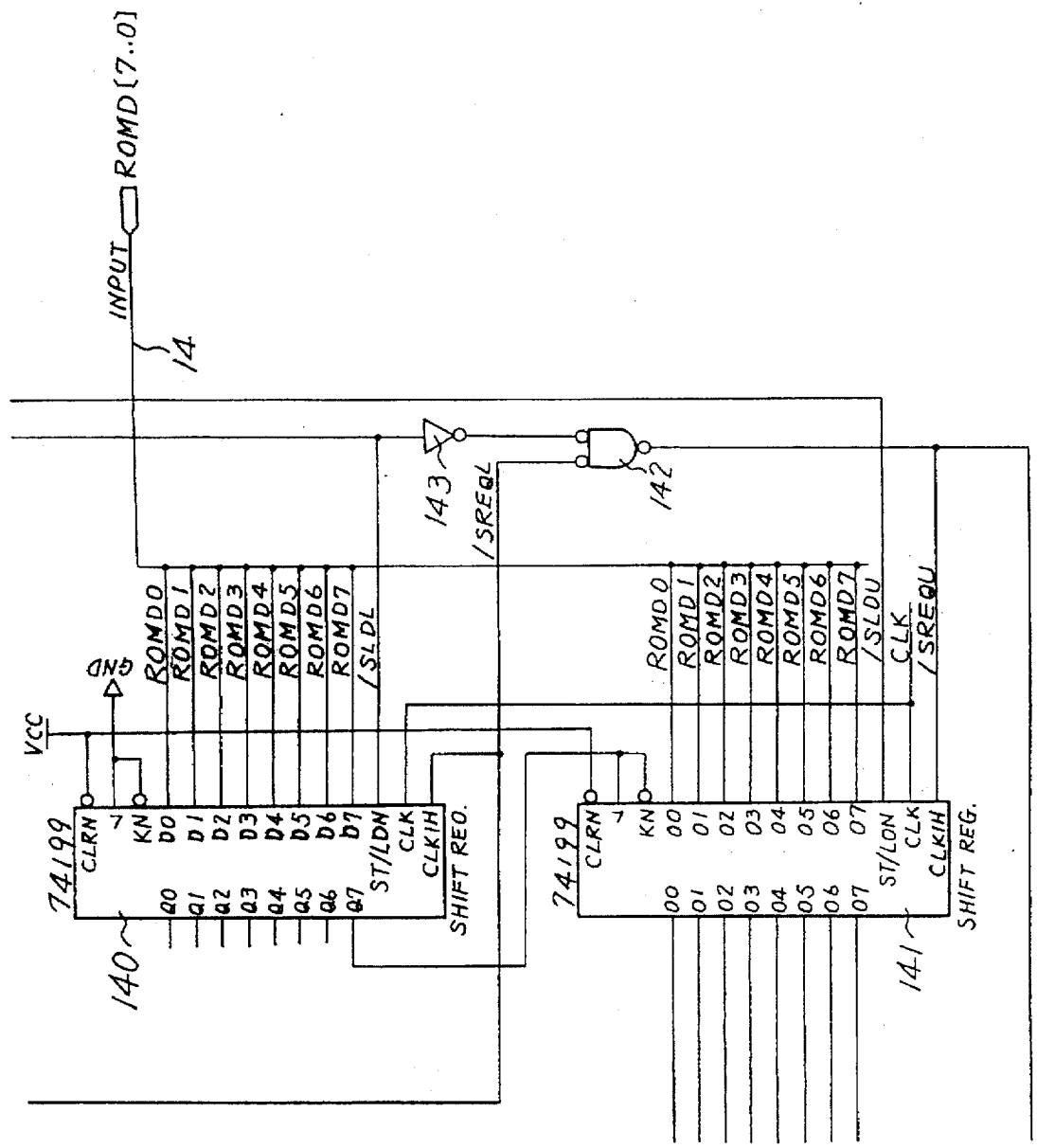
Figure 15:
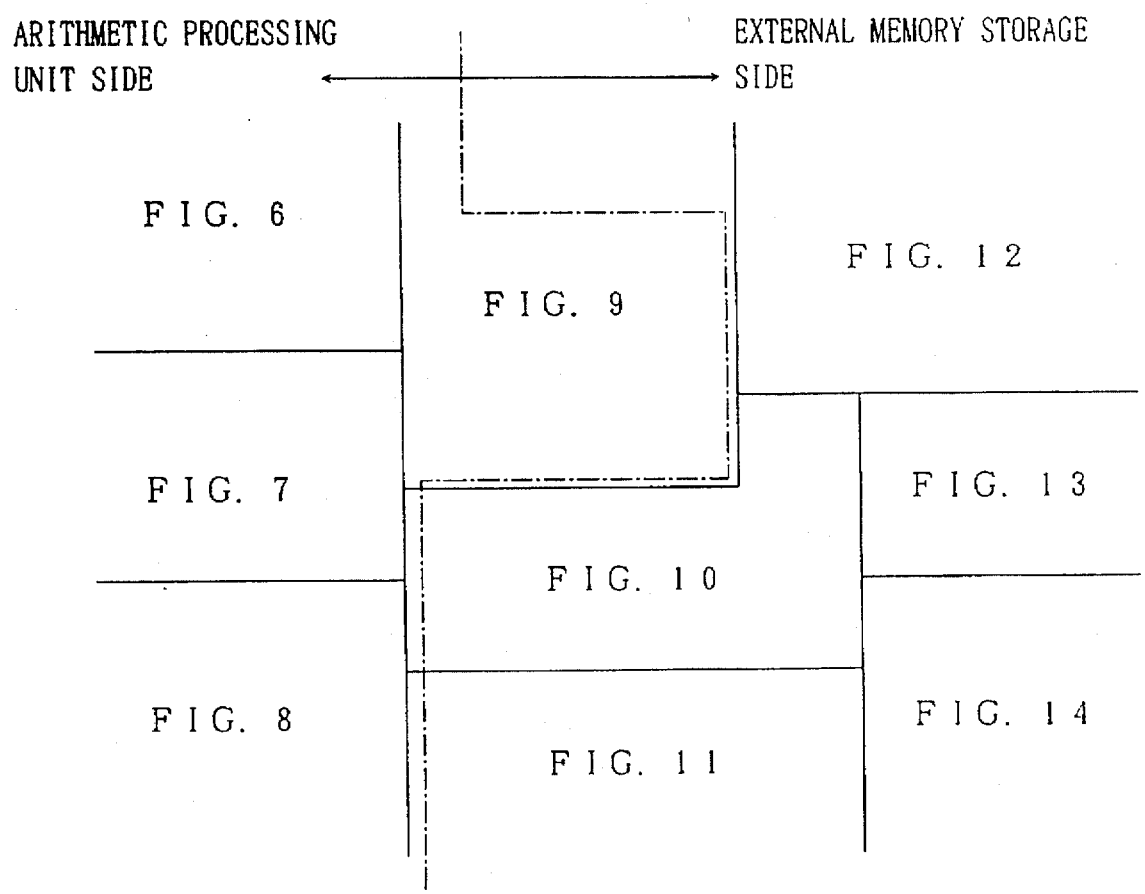

FIG. 15 is an explanatory diagram showing the relation for positioning each of FIGS. 6 through 14 showing the detail of the structure of the first embodiment of FIG. 1.

FIG. 16 through 19 are operation time charts of the first embodiment of the present invention.

Figure 20:
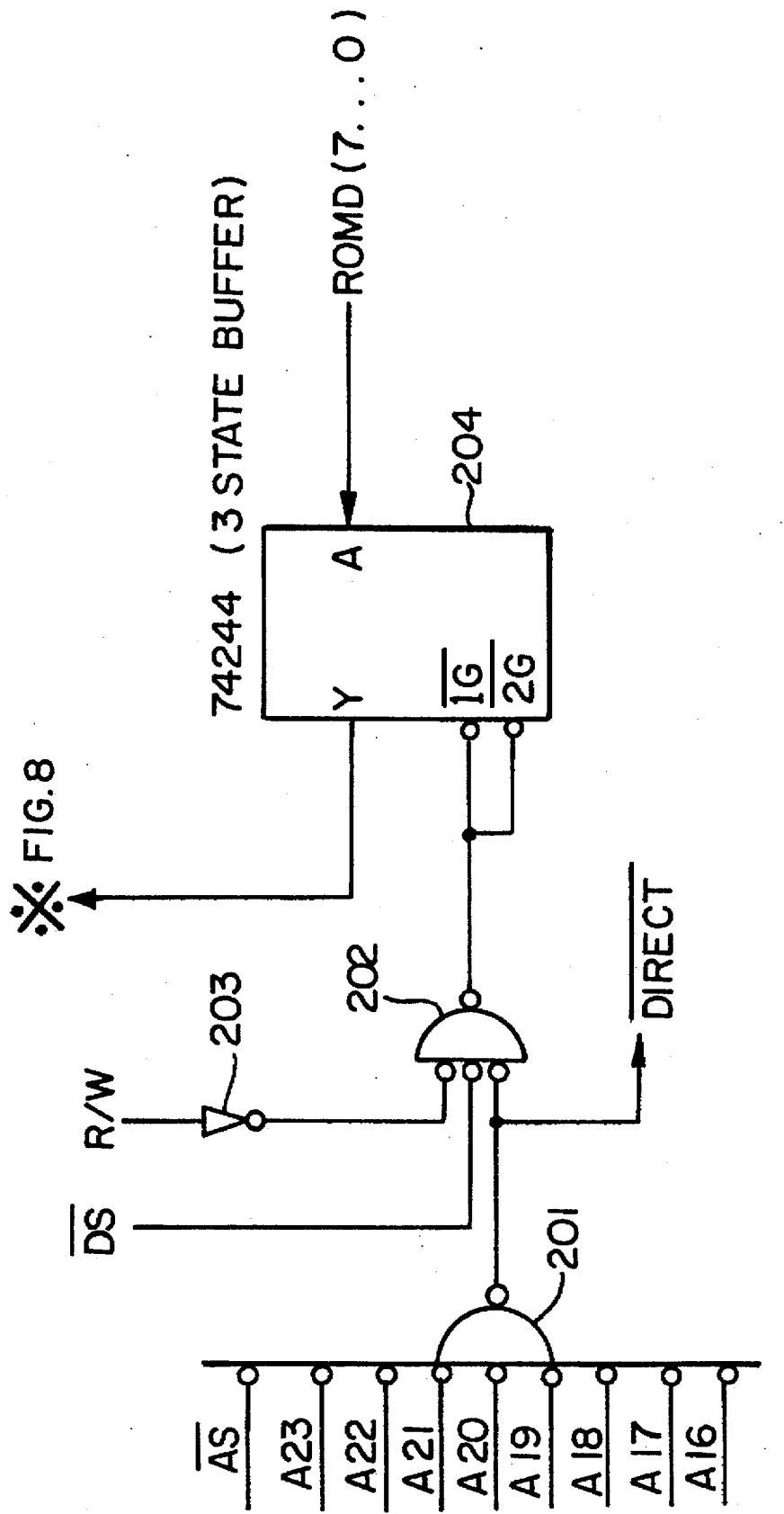

FIG. 20 is a diagram showing an additional circuit for reading the ROM data directly without decoding.

Figure 21:
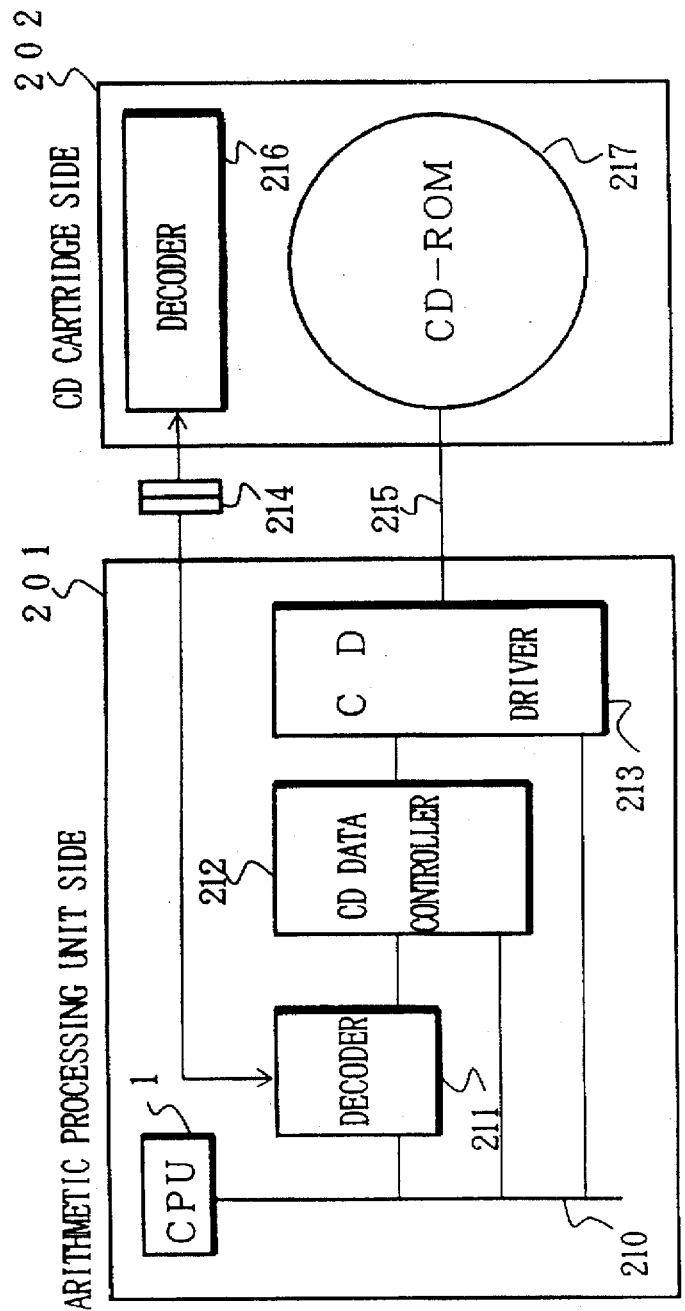

FIG. 21 is a block diagram showing the structure of the second embodiment according to the present invention.

DESCRIPTION OF THE PREFERRED EMBODIMENTS

FIG. 1 is a block diagram showing the structure of the first embodiment, which shows the structural section according to the present invention of the arithmetic processing unit 201 and the external memory storage 202, and these connecting relation.

The arithmetic processing unit 201 and the external memory storage 202 are detachably connected by fixed connector terminals, not shown in the diagram.

In the arithmetic processing unit 201, each kinds of I/O circuits and arithmetic function circuits, besides CPU 1, are connected to a bus BS.

As is apparent from the later-explanation, the embodiment of the present invention has a function of data processing to read a compressed data stored in ROM 2 of the external memory storage 202, decode the compressed data to the original data, and send the decoded original data to CPU 1.

Accordingly, in FIG. 1, only the structure of the decoder provided on the side of arithmetic processing unit 201, which is a part of the structure to which the present invention is related, is connected and shown in the bus BS on the side of arithmetic processing unit 201, for making the explanation simple.

The decoder provided on the side of the arithmetic processing unit 201 is constituted to have the main control section 3, a run length counter 4 and run data 5.

On the other hand, the external memory storage 202 detachably connected to the arithmetic processing unit 201 is like, for example, a game cartridge.

This game cartridge has ROM 2 storing a game program data, more particularly, a compressed data, according to the embodiment of the present invention.

Thus, it is necessary to decode the compressed data read from ROM 2 to the original data. This decoding is performed by sharing the function to the decoder on the side of the above-described arithmetic processing unit 201 and the decoder on the side of the external memory storage 202.

In this way, the function for performing the specified data processing is shared on the side of the arithmetic processing unit 201 and the side of the external memory storage 202 according to the present invention.

Accordingly, it becomes possible to solve the above-described problems, that is, occupying of CPU, and the cost of the external memory storage.

In the structure of the embodiment shown in FIG. 1, the decoder on the side of the external memory storage 202 has a ROM address counter 6, a shift register 7, a ROM read control section 8, a shift register control section 9 and a Huffman's decoding table 10.

One example of the compressed data stored in ROM 2 will be described, as the embodiment of the present invention, for understanding the later-explanation. The compressed data stored in ROM 2 is obtained by performing run length coding of the binary digital data at first and performing the Huffman's coding of the run length coded data, next.

FIG. 2 explains this coding concretely. That is, the case where the original data is used as the binary digital data of 56 bits, as shown in the diagram, will be considered as one example.

This binary digital data represents the value of the hexadecimal value, respectively, as a set of 4 bits. Accordingly, when the binary digital data of 56 bits shown in FIG. 2 is divided into sets of 4 bits, it is represented as EEEEE999993311 by the hexadecimal code.

When this data is performed run length coding and represented the series of the run data, that is, the run length as a set, it becomes E4943111, as shown in FIG. 2.

Next, the data performed run length coding is performed Huffman's coding in this way. It is a feature of the Huffman's coding to make the coded bit number to different one according to the frequency of occurring the code.

FIG. 3 shows one example of the above-described Huffman's coding, and each of the hexadecimal original data 0 to F corresponds to the Huffman's codes for run data and for run length.

In the run length coded data of E5953212 shown in FIG. 2, for example, a run data E corresponds to the Huffman's code of 11111110, as a case example. Further, the run length 4 corresponds to the Huffman's code of 1010.

Referring to such a relation, the above-described run length coded data of E4943111 becomes 11111110|1010|11110|1010|11000|01|01|01 by Huffman's coding.

Accordingly, it is apparent that the original binary data of 56 bits is compressed to the binary data of 32 bits. This compressed binary data is stored in ROM 2 of the external memory storage 202 shown in FIG. 1.

FIGS. 6 through 13 show by dividing the concrete example of a circuit having the structure of the first embodiment shown in FIG. 1 to read the compressed memory data from ROM 2, decode the data to the original binary data and send the data to CPU 1.

FIG. 15 is an explanatory diagram showing the relation of the position of FIGS. 6 through 14 that are divided. In FIG. 15, the left portion divided with a broken line illustrates a section provided on the side of the arithmetic processing unit 201 and the right portion illustrates a section provided on the side of the external memory storage 202.

Further, FIGS. 16 through 19 are the operation time charts according to the embodiment of FIG. 1 and FIGS. 6 through 14.

In the operation time charts shown in FIGS. 16 through 19, FIGS. 16 and 17 show the operation time chart on the step for setting read address for ROM 2, mainly.

Figure 16:
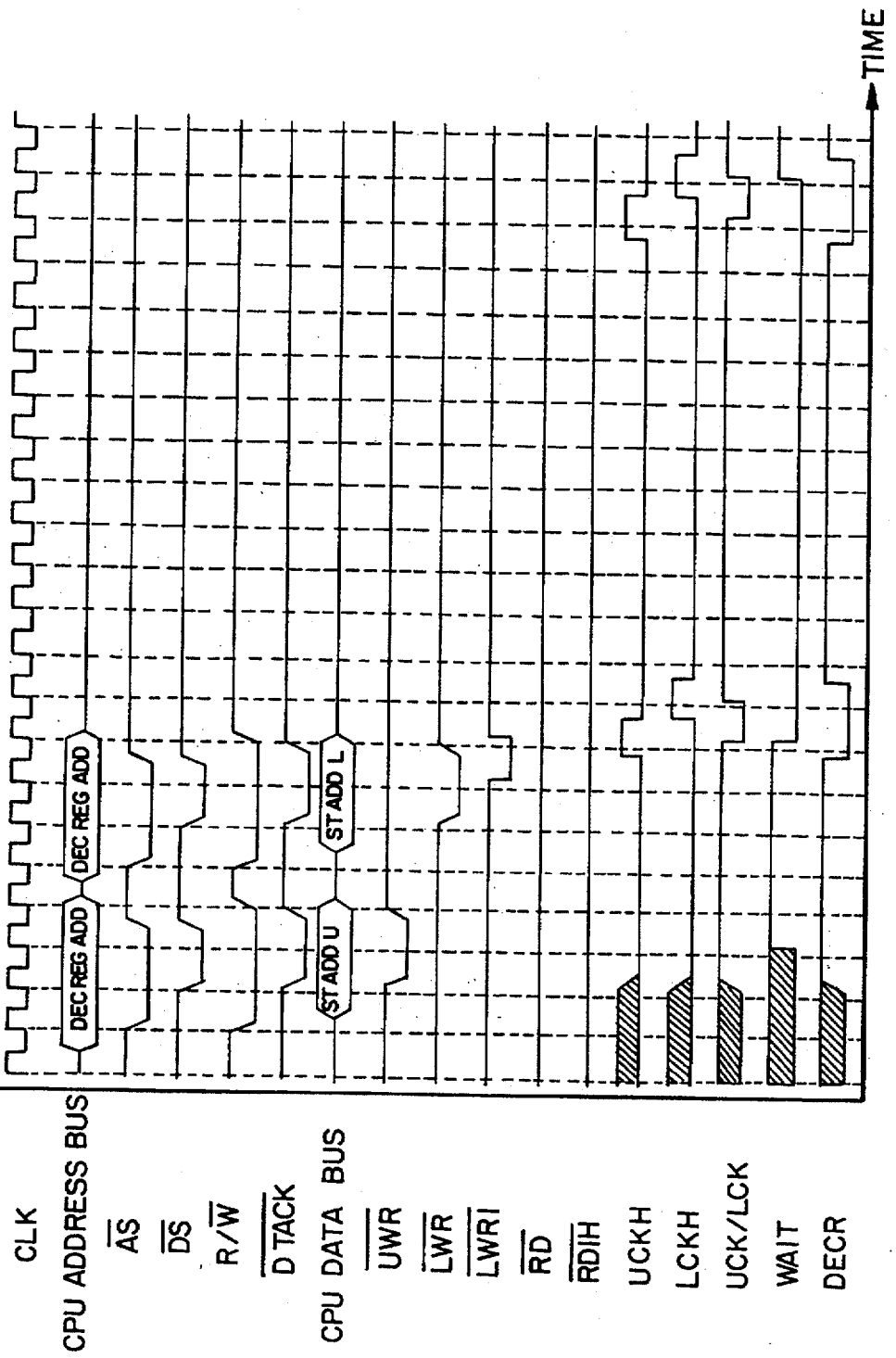
Figure 17:
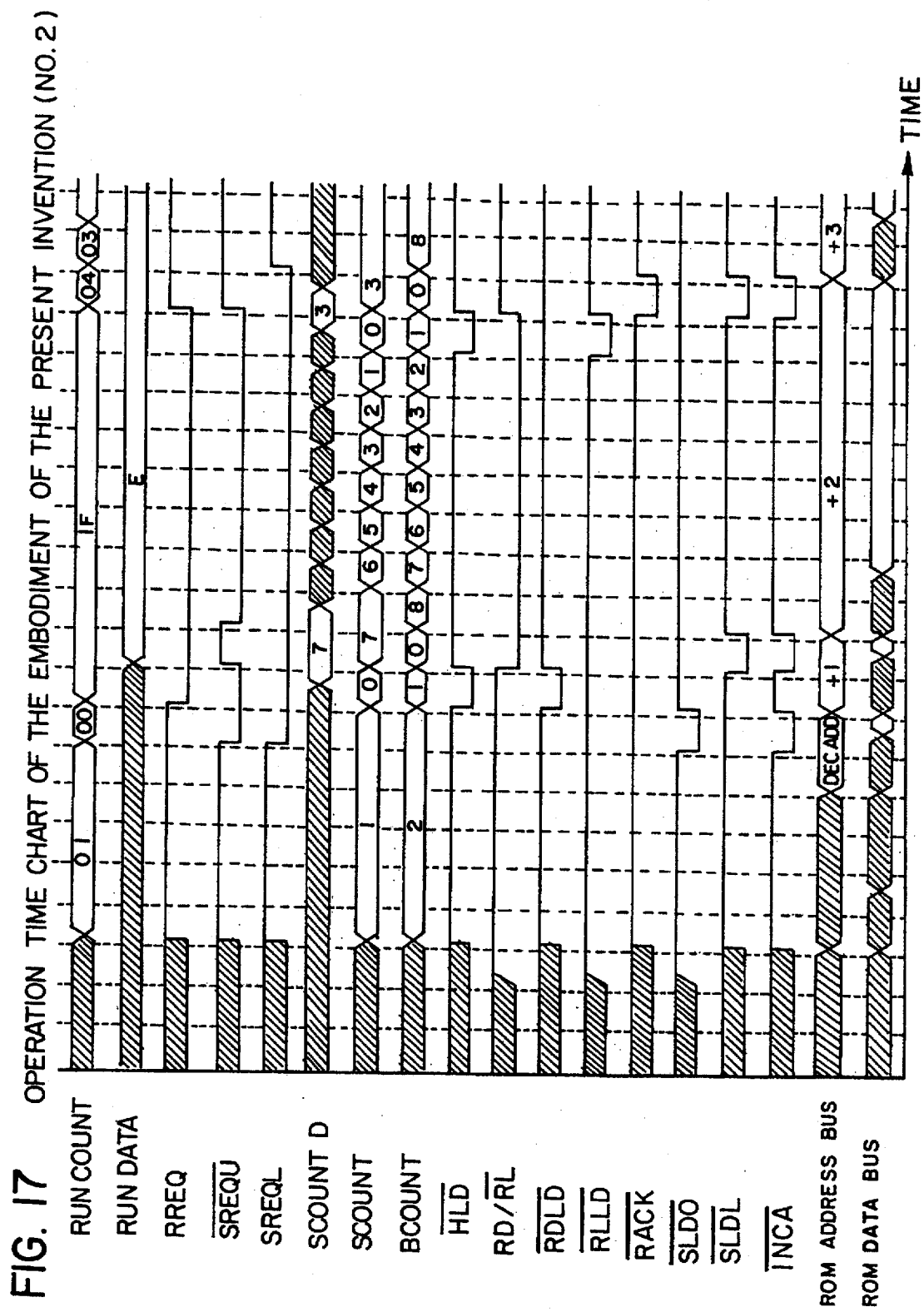
Figure 18:
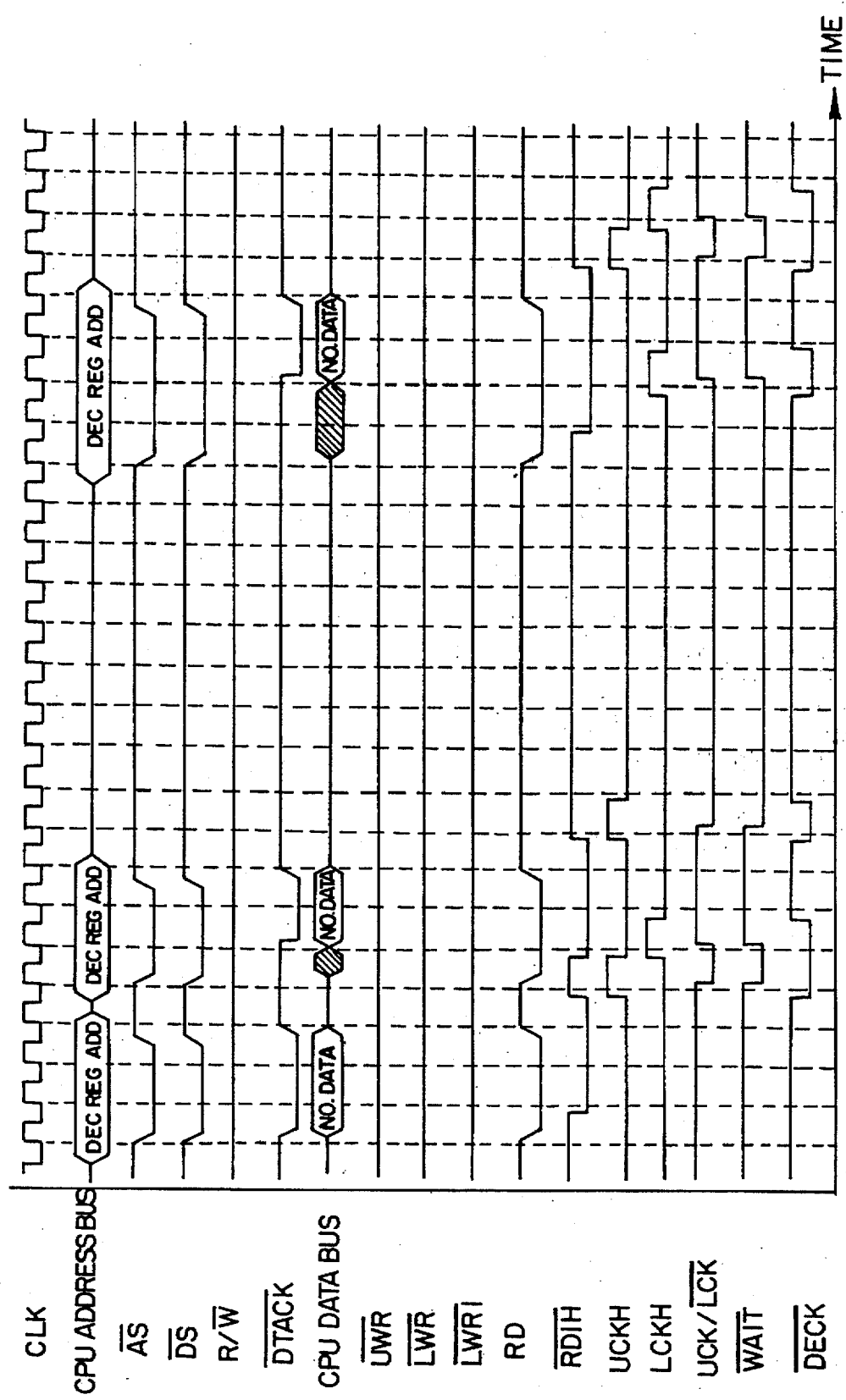
Figure 19:
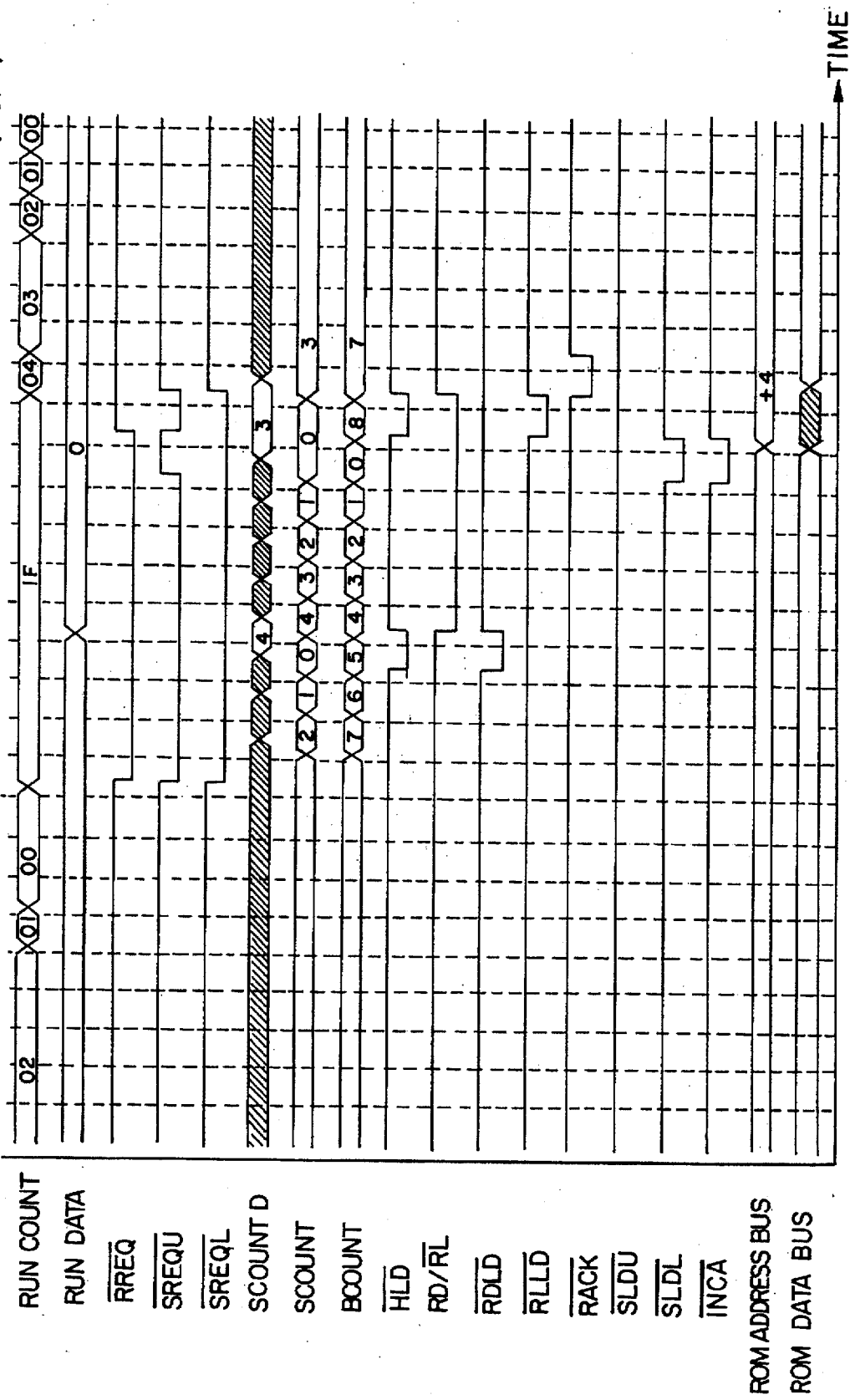

Further, in FIGS. 18 and 19, the time sequence is continued for the operation time chart of FIGS. 16 and 17, respectively, and FIGS. 18 and 19 are the operation time charts on the step for reading out the decoded data, mainly.

Referring to these operation time charts, the operation of the circuit of FIG. 1 and FIGS. 6 through 14 will be explained as follows;

Return to FIG. 1, CPU address signal CPUA is given to the main control Section 3 from CPU 1 through CPU address bus 11.

Figure 6:
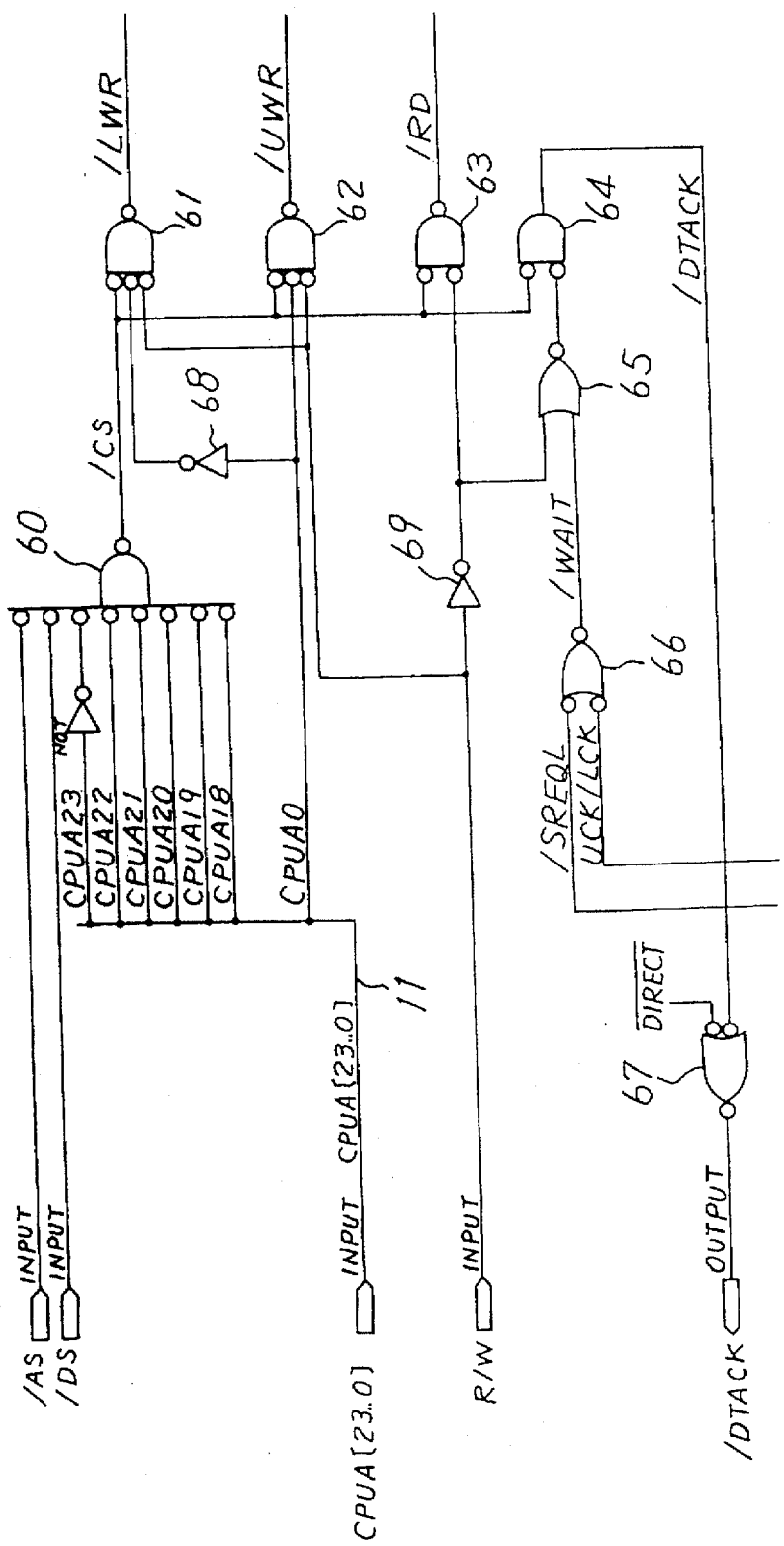
Figure 7:
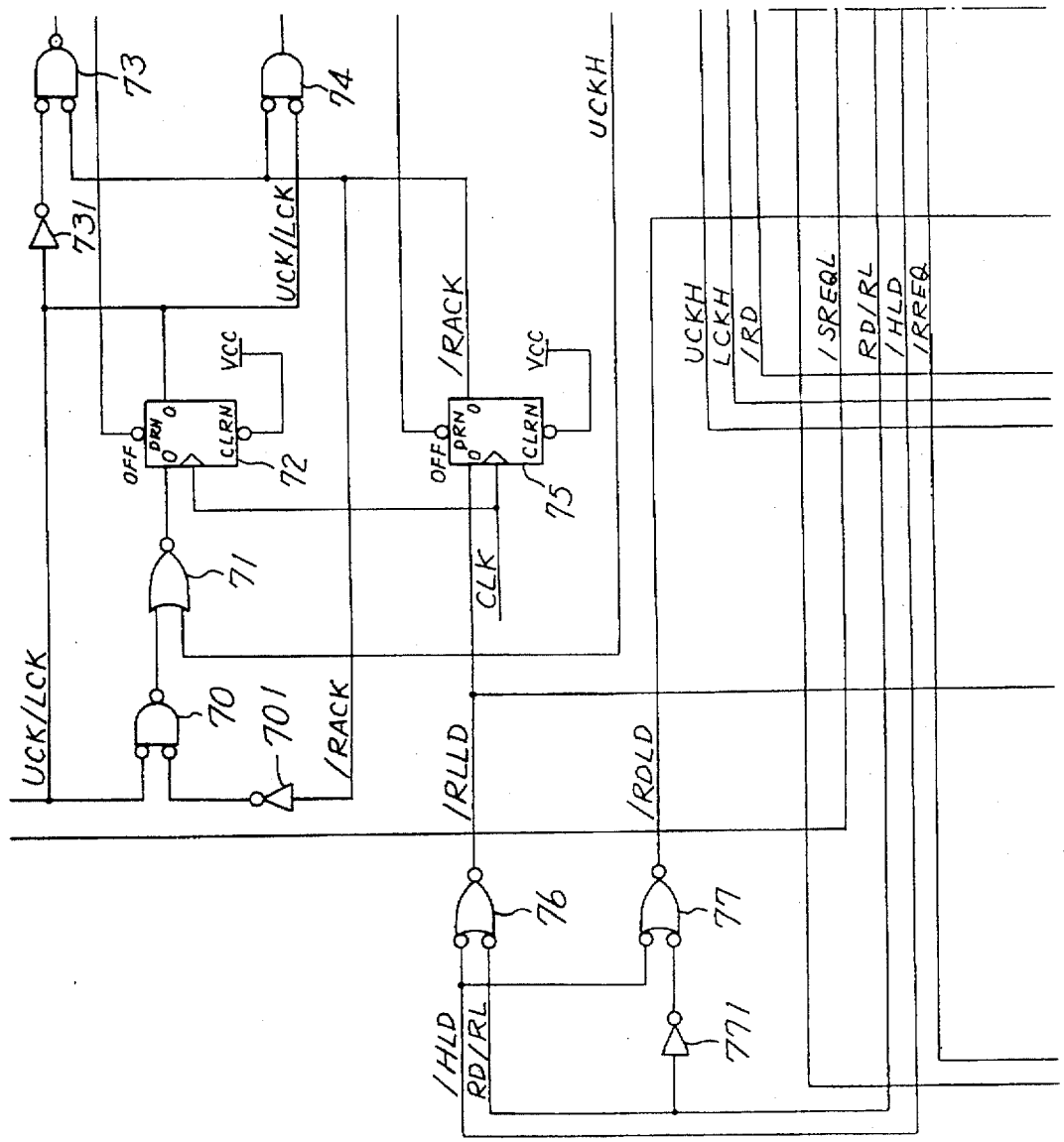

The part of structure of the main control section 3 is shown in FIG. 6. In FIG. 6, reference numeral "60" is a NAND gate having 8 input terminals. The CPU address signal CPUA [23 ... 0] (NOTE: the figure in a square bracket shows the bit number of signal, and represents the bit number of signal 23 to 0 in this embodiment. This rule is also applied correspondingly to the following) on CPU address bus 11 and /AS and /DS signals (refer to FIG. 16) are given to this NAND gate 60.

It is detected with this NAND gate 60 that the memory area addresses of 800000 to 83FFFF in ROM 2 are accessed. The detecting output of NAND gate 60 is further inputted to NAND gates 61, 62, 63 and 64.

As an inverter 68 exists when the write/read signal R/Q is active, /LWR and /UWR signals are outputted from NAND gates 61 and 62, respectively, according to the condition of 0 bit of CPU address signal CPUA.

Each of /LWR and /UWR signals is inputted to a ROM address counter 6 (refer to FIG. 1). The ROM address counter 6 is constituted of two up down counters 121 and 123, and each of /LWR and /UWR signals is inputted to the load-on terminal (LON) of the counters 121 and 123, respectively (refer to FIG. 12).

On the other hand, a read start address is inputted to the counters 121 and 123 constituted the ROM address counter 6 via the CPU data bus 12 (refer to FIG. 1).

This read start address is sent eight by eight bits as a lower start address and the upper start address, and the upper 8 bits are loaded to the counter 123 and the lower 8 bits are loaded to the counter 121, subsequently by /UWR and LWR (refer to FIG. 16).

Accordingly, ROM address ROMA [15 ... 0] is outputted from the counters 121 and 123 to the ROM address bus 13 as the initial value of the counter.

Figure 12:
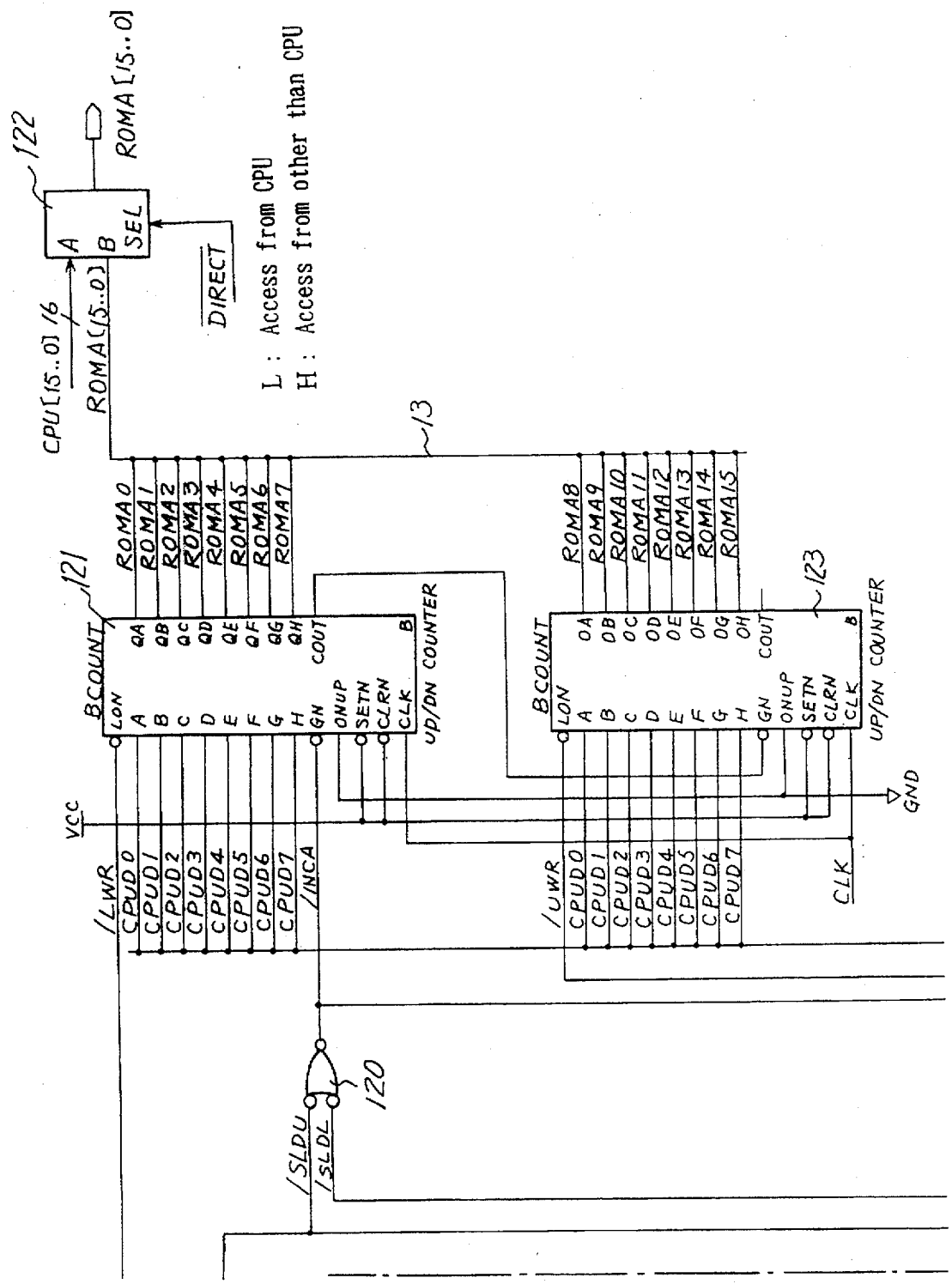

This ROM address ROMA [15 ... 0] is further inputted to the selector 122 and selected when the selection signal (/DIRECT) is inactive, and sent to the ROM 2 (refer to, FIG. 12).

On the other hand, the ROM read control section 8 (refer to FIG. 1) is constituted of double D-FF (flip-flop) 90 and 91 (refer to FIG. 9) and NOR gate 120 (refer to FIG. 12).

/LWR is inputted to the double D-FF (flip-flop) 90 and 91, and /SLDU which is a signal for load-controlling the upper data to the shift register 7 at first time only once is outputted (refer to FIG. 17).

/SLDU is also inputted to one input terminal of NOR gate 120 (refer to FIG. 12) which is a part of structure of the ROM read control section 8.

Further, /SLDL which is a signal for load-controlling the lower data to the shift register 7 is inputted to the other input terminal of NOR gate 120 (refer to FIGS. 12 and 17).

Accordingly, an address forward signal /INCA is outputted from the NOR gate 120 at each timing of both the signals. The ROM address counter 6 is forwarded with /INCA, step by step, that is, the address data on the ROM address bus 13 is forwarded step by step.

Hereupon, the shift register 7 is constituted of the lower shift register 140 and the upper shift register 141 which are TTL logic, as shown in FIG. 14.

As the above-described, for the time when the start address is set to the ROM address counter 6, the ROM data which is outputted from the ROM 2 to the ROM data bus 14 based on /SLDU is set to the lower shift register 140 and the upper shift register 141 at the same time (refer to FIG. 17).

The ROM data is then set only to the lower shift register 140, so that the data is shifted from the lower shift register 140 to the upper shift register 141, subsequently.

The control for shifting in the shift registers 140 and 141 is performed by /SREQL (refer to FIGS. 10 and 13) outputted from the NOR gate 101 which is a part of the structure of the shift register control section 9 explained later, and /SREQU (refer to FIG. 14) outputted from the NAND gate 142.

The ROM data, which is an output of the shift register 7, to be concrete, the upper shift register 141, is led to the Huffman's decoding table 10 (refer to FIGS. 1 and 11), and becomes an address for the Huffman's decoding table 10.

In here, the ROM data which is an output of the shift register 7 is the Huffman's code. The relation between the Huffman's code and the decoded output will be explained as follows.

As the above-explained in FIG. 3, the run length coded data is performed Huffman's coding for each of the run data and the run length.

Accordingly, it is required to decode the Huffman's code into each of the run data and the run length corresponding to the Huffman's code. Thus, the Huffman's decoding table 10 prepares a Huffman's decoding table 116 for the run data and a Huffman's decoding table 114 for the run length (refer to FIG. 11).

These Huffman's decoding tables 116 and 114 are constituted of one type of storage circuit. Accordingly, it is possible to form the tables 116 and 114 by various kinds of means. For example, the tables can be commonly constituted by using a ROM or they are varied to different tables for each external memory storage with a RAM.

FIG. 4 is an explanatory diagram of the Huffman's decoding table 116 for the run data. The decoded data (DATA 3 to 0) of 4 bits and the Huffman's code length (code length—1) (CLEN 3 to 0) of 3 bits stored in the corresponding address are outputted, by using the Huffman's code of HUF 7 to 0 of 8 bits obtained from the shift register 141 as an address.

In the same way, FIG. 5 is an explanatory diagram of the Huffman's decoding table 114 for the run length. The decoded data (DATA 2 to 0) of 4 bits and the Huffman's code length (code length—1) (CLEN 2 to 0) of 3 bits stored in the corresponding address are outputted, by using the Huffman's code HUF 7 to 0 of 8 bits obtained from the shift register 141 as an address.

Figure 11:
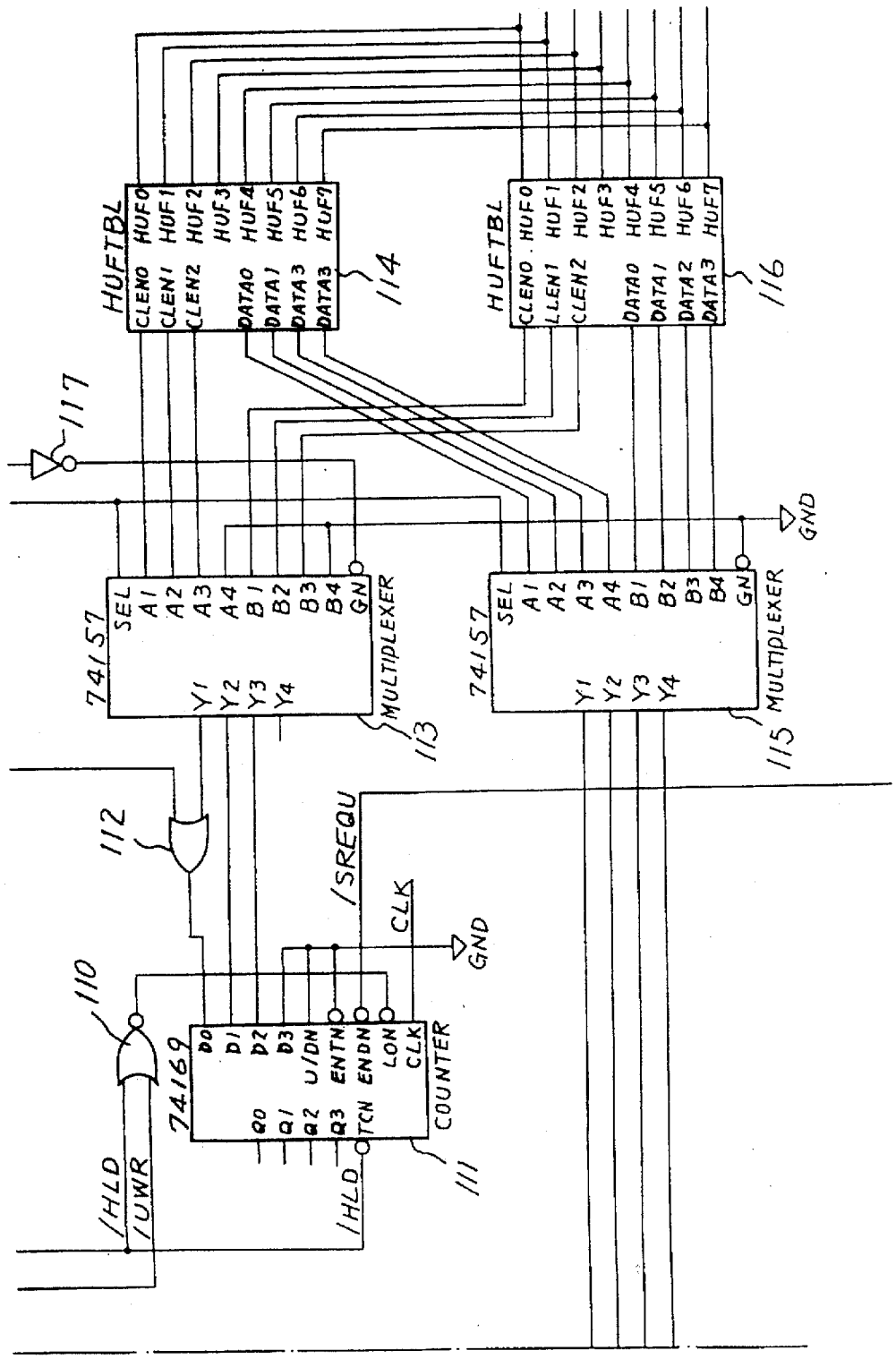

In FIG. 11, the Huffman's code length for the run data of 3 bits and the Huffman's code length for the run length of 3 bits are inputted from the Huffman's decoding tables 116 and 114 to the multiplexor 113, respectively.

Similarly, reference numeral "115" is a multiplexor, to which the decoded data for the run data of 4 bits and the decoded data for the run data of 4 bits and the decoded data for the run length of 4 bits are inputted from the Huffman's decoding tables 116 and 114.

RD/RL (refer to FIGS. 17 and 19) is inputted from T-FF 100 (refer to FIG. 10) to the SEL terminals of the multiplexors 113 and 115.

Accordingly, the multiplexor 113 outputs the Huffman's code length from the Huffman's decoding table 114 for run length or the Huffman's code length from the Huffman's decoding table 116 for the run data, alternately, depending on the logic level of RD/RL.

In the same way, the multiplexor 115 outputs the run data from the Huffman's decoding table 114 for the run length or the run data from the Huffman's decoding table 116 for the run data, alternately, depending on the logic level of RD/RL.

In this way, it becomes possible to use the bus connection of 4 bits by using the multiplexors 113 and 115. Of course it also becomes possible to constitute so as to output with 8 bits bus without using the multiplexor.

The Huffman's code length from the multiplexor 113 is led to the counter 111 for constituting a part of the shift register control section 9 (refer to FIG. 1). The counter 111 counts down for the Huffman's code length which is inputted, and outputs /HLD, when the counter becomes 0 (refer to FIG. 17).

Figure 10:
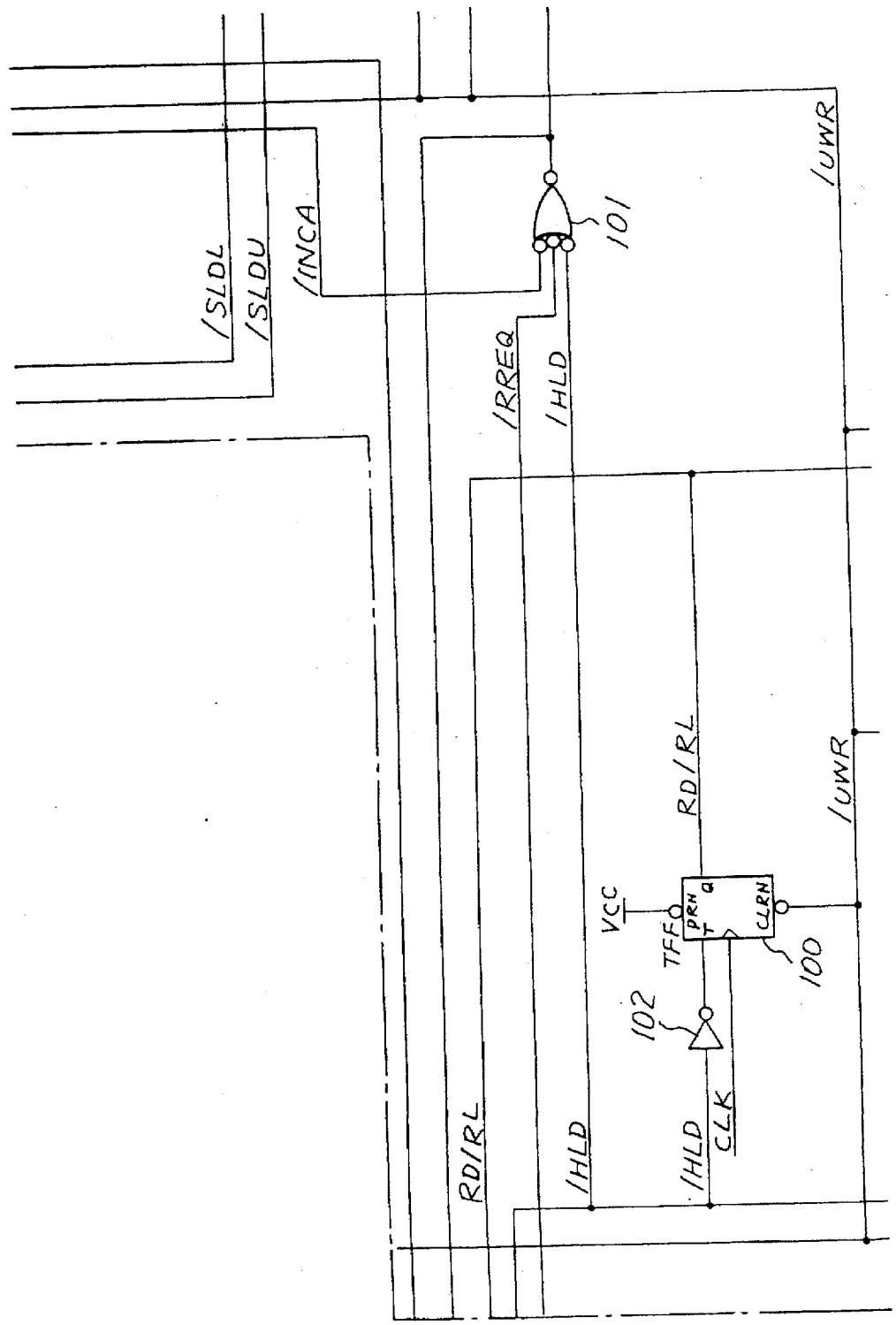

/HLD becomes RD/RL through T-FF 100, as the above-described, and it is inputted to the selecting terminals SEL of the multiplexors 113 and 115 to control so as to switch the output of the Huffman's decoding tables 114 and 116 (refer to FIGS. 10 and 11).

/HLD is inputted to the LDN terminal of the counter 111 by the NOR gate 110 of FIG. 11 and makes it possible to input the new Huffman's code length.

Further, /HLD signal is inputted to the NOR gate 101 (refer to FIG. 10) and becomes the shift request signal SREQL for the B counter 130 (refer to FIG. 13).

This shift request signal /SREQL is generated when /INCA or /RREQ is inputted to the NOR gate 101 besides /HLD (refer to FIG. 10).

/INCA is the output of the NAND gate 120 (refer to FIG. 2). Further, /RREQ is led from the run length counter 80 (refer to FIG. 8) as the later described.

The B counter 130 counts down while the shift request signal /SREQL is active (refer to BCOUNT of FIGS. 17 and 19).

When the count value of the B counter 130 becomes 0, /SLDL is outputted and controls so as to take the ROM data from the ROM data bus 14 again, for the shift register 140 (refer to FIG. 14) for the lower data.

Return to FIG. 1, the Huffman's decoded run length data from the Huffman's decoding table 10 is inputted to the run length counter 4 and the run data is inputted to the run data register 5.

The run length data inputted to the run length counter 4 is subtracted sequentially until the data becomes 0 based on the subtracting instruction from the main control section 3.

On the other hand, the run data inputted to the run data register 5 is outputted to the CPU data bus 12 repeatedly, until the run length counter 4 becomes 0. Therefore, as the run data and the repetition times of outputting the data are grasped by CPU 1, the run length code is decoded.

To improve this function, the circuit will be further explained, concretely. The multiplexor 115 of FIG. 11 constitutes a part of the Huffman's decoding table 10 and outputs the decoded data from the Huffman's decoding table 114 and 116, alternatively, as explained above.

The run length counter 4 is constituted of a counter 80 (refer to FIG. 8) which is a TTL circuit and a NAND gate 81.

As the decoded data from the Huffman's decoding table 114 is the data for the run length, the decoded data is set by inputting to this counter 80. The set of the data for the run length to the counter 80 is performed at the timing when the output /RLLD from the NOR gate 76 (refer to FIG. 7) inputs to the LDN terminal of the counter 80 (refer to FIGS. 17 and 19).

Figure 8:
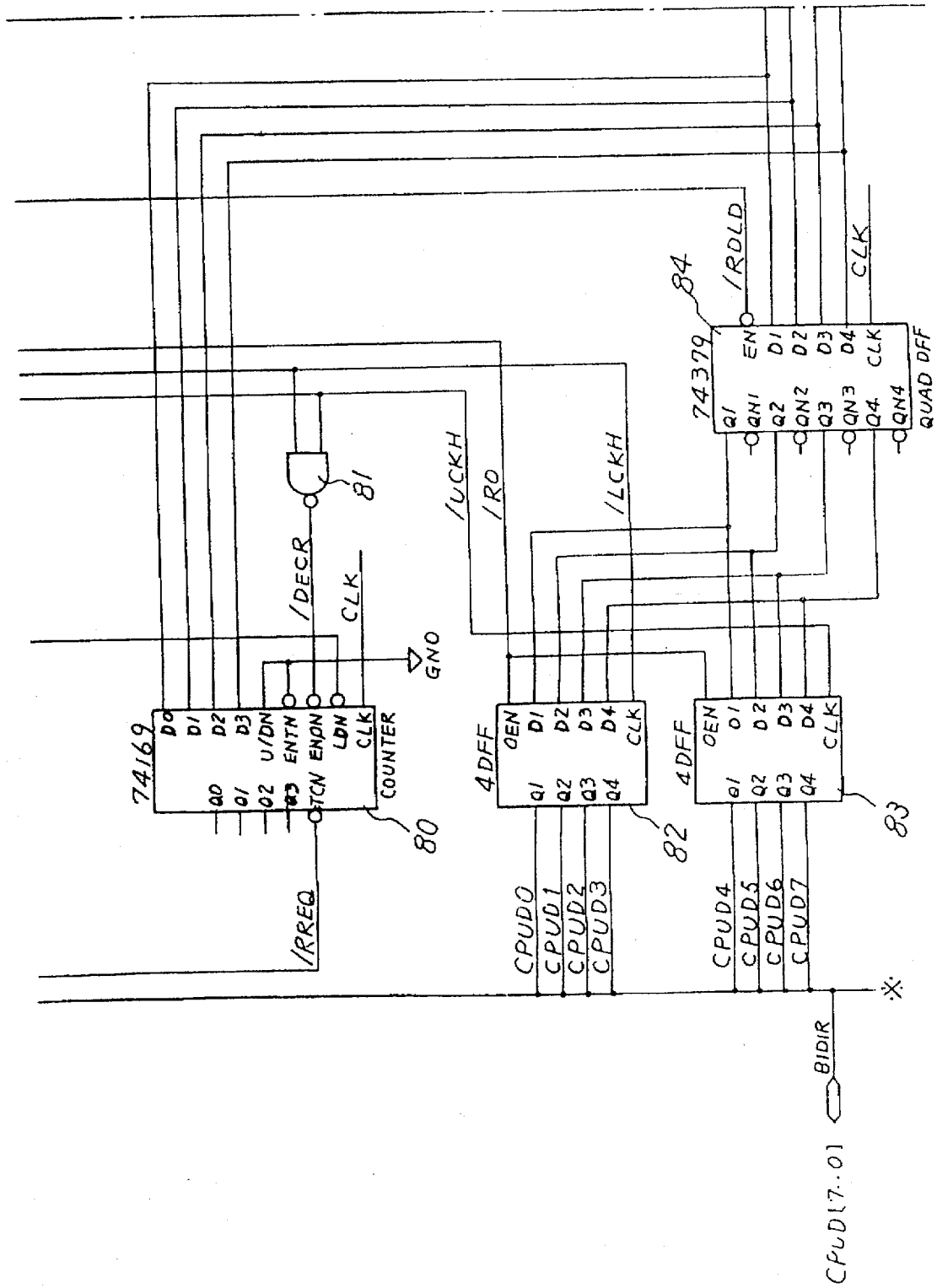

On the other hand, the run data which is the decoded data from the Huffman's decoding table 116 is inputted to the double D-FF 84 which constitutes the run data register (refer to FIG. 8).

Figure 9:
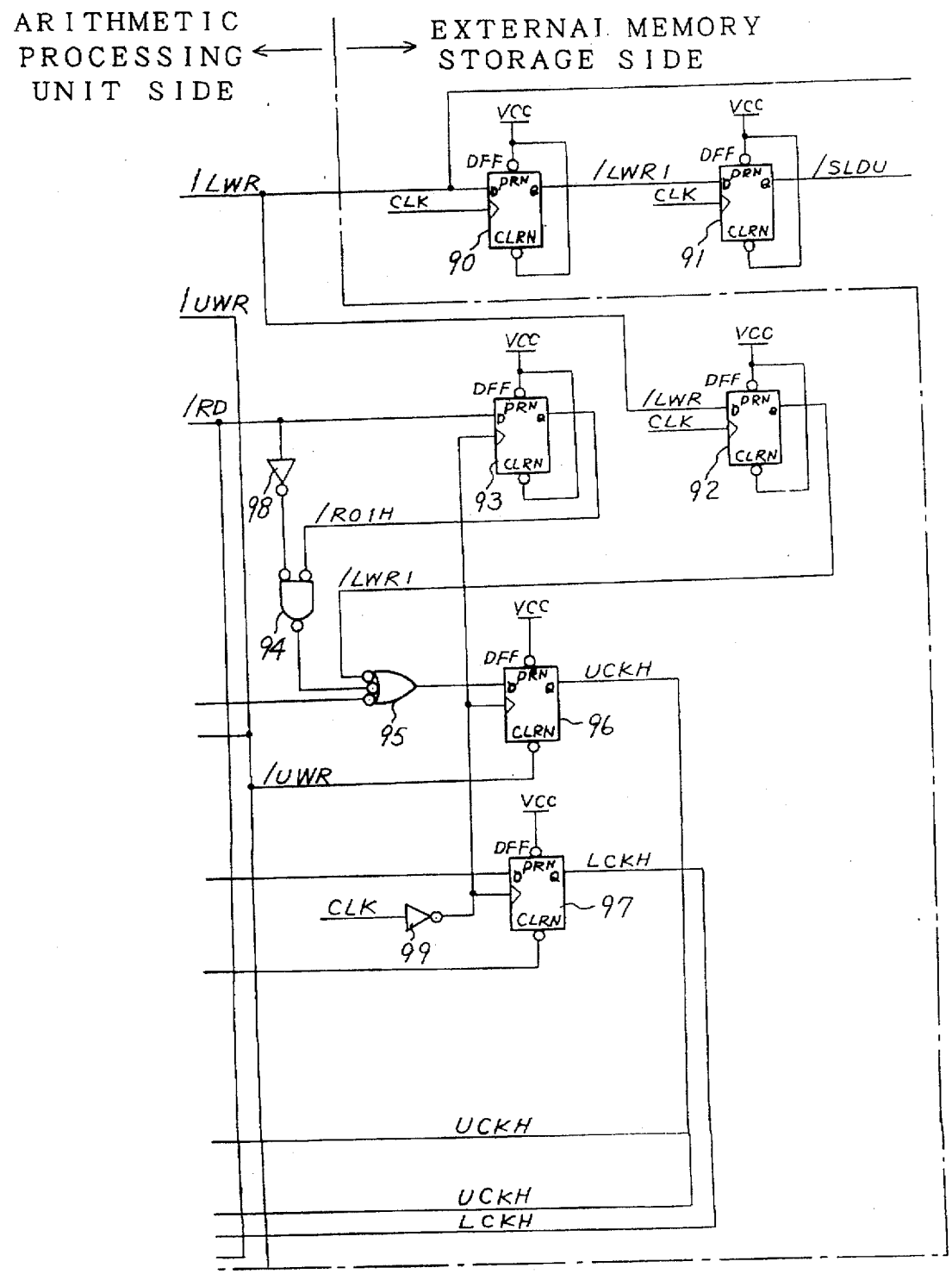

The data set in the double D-FF 84 is set to the D-FFs 82 and 83 per lower 4 bits and upper 4 bits (refer to FIG. 8) at the timing of /UCKH and /LCKL outputted form the D-FFs 96 and 97 (refer to FIG. 9).

When the run data is set to both of the D-FFs 82 and 83, the data is inputted to CPU 1 via the CPU data bus.

The counter 80 is given /DECR by the NAND gate 81 and performs subtraction of the number of run length set by the clock CLK, when /UCKH and /LCKL are inactive (refer to the RUN count of FIGS. 17 and 19).

In the case where the subtraction is continued and when the set value becomes 0, /RREQ signal is generated and the subsequent data read request is performed. The data read request is inputted to the above-explained NOR gate 101 (refer to FIG. 10), to perform the shift controlling for the counter 130 (/AREQL).

Accordingly, the same run data is outputted from the D-FFs 82 and 83 to the CPU data bus 12, until the subsequent data read request is performed, that is, the counter 80 subtracts the number of the run length set therein and the number counts down to zero.

As the above-explained, in the first embodiment of the present invention, the data compressed by the run length coding and the Huffman's coding is stored in ROM 2 of the external memory storage 202.

This decoding processing function used in the case where the data stored in the ROM 2 is read out, is shared to the Huffman's decoding with the Huffman's decoding table 10 provided on the external memory storage 202 and the run length decoding with the run length counter 4 and the run data register 5 provided on the arithmetic processing unit 201.

Accordingly, it is prevented to increase the cost of the external memory storage 202 caused by giving the decoding processing function only to the external memory storage 202.

Further, even if it is the case where the compressed data stored in the ROM 2 is copied illegally, the original data can not be restored only by the copied data, because the converting table of the Huffman's decoding table 10 is required.

In this way, the embodiment of the present invention gives to prevent from copying the program data illegally.

Although the above-described first embodiment is explained by using ROM 2 as a storage medium of the external memory storage 202, the present invention is not limited to ROM 2, a flush memory and RAM attached battery back up can be used as a storage medium.

FIG. 20 shows a structure of the circuit used in the case where an additional function is added to the first embodiment of the present invention. That is, there is a case where the data that is not compressed is stored, besides the case where the data compressed by coding is Stored in ROM 2.

Accordingly, FIG. 20 shows the circuit for reading out the data in the latter case directly by CPU 1.

The circuit shown in FIG. 20 has a NAND gate 201 for detecting the upper bits (A16 to 23) of the address signal at the timing of address strobe AS, corresponding to the address area of ROM 2 for storing the data that is not compressed.

The 3 state buffer circuit 204 is triggered by the output of the NAND gate 202, when the output of the NAND gate 201 becomes /DIRECT, and the output corresponds to the timing of R/W given via the inverter 203.

In this case, the address signal CPU [15 . . . 0] inputted to the NAND gate 201 is further inputted to the selector 122 (refer to FIG. 12). The selector 122 selects and switches the address signal CPU [15 . . . 0] with /DIRECT, so that the ROM 2 can be accessed.

Therefore, the 3 state buffer circuit 204 can take the ROM data [7 . . . 0] from the ROM 2.

Then, the ROM data which is not compressed is led to the CPU 1 via the CPU data bus 12 of FIG. 8 without passing via the decoding means.

FIG. 21 is a block diagram showing the structure of the second embodiment of the present invention. More particularly, the second embodiment has a feature of that CD-ROM is provided to the external memory storage 202 as a storage medium.

That is, it is constituted of the arithmetic processing unit 201 and the CD cartridge 202 which is the external memory storage. The CD cartridge 202 has a CD-ROM 217 used as a medium for storing the coded data, as the above-explained relating to the first embodiment, and a decoder 216 in which the decoded table for decoding the coded data stored in the CD-ROM 217 is provided.

The animation data and the voice data which are coded by MPEG are stored in the CD-ROM 217. The decoder 216 is connected to the arithmetic processing unit 201 via the connector for connecting the CD cartridge 214.

A CD driver 213 is provided to read the data of the CD-ROM 217 in the arithmetic processing unit 201.

The CD driver 213 is connected to the CD-ROM 217 by a laser light 215. That is, the CD driver 213 is constituted so as to scan on the CD-ROM 217 by the laser light 215 and read the stored data.

Further, the CD driver 213 is connected to the CD data controller 212 for performing the error correction of the CD-ROM standard, for the read data.

The CD data controller 212 is connected to the decoder 211 on the equipment side where the decoding control section corresponding to plural CD cartridges is provided.

The decoder 211 on the equipment side is electrically connected to the decoder 216 on .the side of the cartridge in the CD cartridge 202, via the connector 214 for connecting the CD cartridge.

The decoder 211 on the equipment side is further connected to the CPU 1 for controlling the entire of the arithmetic processing unit, via the bus line 210.

Although each kinds of unit, such as a main storage unit and I/O, requiring for the arithmetic processing unit, are also connected to the bus line 210, it is not shown in the diagram, as it does not relate to the present invention directly in FIG. 21.

Next, the operation for decoding processing on the unit of the embodiment will be explained as follows.

At first, the CPU 1 sends the signal indicating to start reading the data on the CD-ROM 217, for the CD driver 213. The CD driver 213 reads the data on the CD-ROM 217 and passes the data to the CD data controller 212.

The CD data controller 212 performs the error correction of the CD-ROM standard, for the received data, and sends the result of error correction to the decoder 211 on the equipment side.

The decoder 211 on the equipment side performs the decoding of the received data, with referring to the decoding table of the decoder 216 on the side of the cartridge via the connector 214 for connecting the CD cartridge.

Although the content of this decoding table is different depending on the method for coding, it is similar to the decoding table 10 of the first embodiment as the above-explained, basically.

The decoder 211 on the equipment side passes the decoded data to the CPU 1, via the data bus 210, after completing to decode the data.

Considered the decoding for the run length code as the same as the first embodiment of FIG. 1, the decoder 211 on the equipment side is constituted of the run length counter and the run data register, basically.

The above-mentioned explanation is the operation of the coding processing of the second embodiment.

In this way, according to the present invention, as the hardware is prepared for the processing of decoding the data, as the same as the first embodiment, it becomes possible to decode rapidly, without occupying the processing of CPU.

Further, it is impossible to copy a software only by copying the CD-ROM 217, and it becomes possible to prevent from copying the software illegally, by preparing a different decoder for each cartridge.

It also becomes possible to reduce the size of the decoder provided per the cartridge and prevent the increase in cost, by providing the common part as the decoder 211 on the equipment side, regardless of the data recorded in the CD-ROM 217, and providing the different part such as converting table per the CD-ROM as the decoder 216 on the side of the cartridge.

Although MPEG is used to code the data in the above-described second embodiment, it is not excluded to use the other data compression means, such as MPEG, Huffman's coding, arithmetic coding, and universal coding.

Although the function of the decoder is divided and assigned to the arithmetic processing unit 201, and the game cartridge or the CD cartridge 202 as an external memory storage, it may be provided only to the game cartridge or the CD cartridge 202, without sharing the decoder.

In this case, the price of the game cartridge or the CD cartridge 202 increases, but it becomes possible to give the higher function for preventing from copying.

According to the above-described second embodiment, as a decoder on the side of the cartridge is prepared the different one per CD cartridge, it is also possible to use a common type of the decoder for plural CD cartridges.

In the above embodiment, CD-ROM is used as a storage medium, it is also possible to use LD-ROM, MO, FD and so on.

An information processing system having an arithmetic processing unit and an external memory storage detachably connected to the arithmetic processing unit, has a function for processing data that makes possible to reduce the cost.

Further, an information processing system is proposed that is constituted so as to share the function for decoding the data which is compressed as one example of the data processing into the arithmetic processing unit and an external memory storage.

Furthermore, in an information processing system of the present invention, the determination of authenticity of an external memory storage can be performed without providing any specified processing chip.

According to the present invention, it becomes possible to reduce the cost and prevent from copying the data illegally, and therefore, the present invention can greatly contribute to the industry Although the present invention is explained according to the embodiments, the present invention is not limited to the embodiments. More particularly, although the processing for decoding the coded compressed data stored in the external memory storage is explained as the data processing in the embodiments of the present invention, it is not limited to the data processing of this decoding processing.

It should of course be understood that those which are the same as the technical concept of the invention are within the protective scope of the present invention.

What is claimed is:

1. An information processing system comprising:

an arithmetic processing unit;

an external memory storage including a storage medium for storing data, detachably connected to the arithmetic processing unit; and a data processing means for performing the processing for the data read out from the storage medium of the external memory storage, having a first data processing means provided on the external memory storage and a second data processing means provided on the arithmetic processing unit, the first data processing means and the second data processing means performing processing for the data read out from the storage medium of the external memory storage by sharing the processing.

2. The information processing system according to claim 1, wherein the data stored in said storage medium of the external memory storage is data compressed by coding.

3. The information processing system according to claim 1, wherein the data stored in said storage medium of the external memory storage is the data of binary digital codes coded by at least run length coding.

4. The information processing system according to claim 10, wherein the data stored in said storage medium of the external memory storage is the data of binary digital codes coded by run length coding and further coded by Huffman's coding.

5. The information processing system according to claim 4, wherein in the first data processing means performs Huffman's decoding processing for the Huffman's coding and the second data processing means performs run length decoding processing for the run length coding.

6. The information processing system according to claim 4, wherein the first data processing means has a Huffman's decoding table, and outputs the Huffman's decoded run data and run length data for the stored data by using the stored data as an address, and the second data processing means has a run length counter and a run data register, the run length counter being inputted a Huffman's decoded run length data from the Huffman's decoding table, and the run data register being inputted the Huffman's decoded run data and continuing to output the Huffman's decoded run data until the run length counter subtracts the run length data one by one and the run length data becomes 0.

7. The information processing system according to claim 2, wherein the storage medium is a ROM (Read Only Memory).

8. The information processing system according to claim 2, wherein the data stored in the storage medium of the external memory storage further has uncoded data, and the uncoded data is made not to be an object for processing of the first data processing means and the second data processing means.

9. An external memory storage comprising:

a storage medium, and a data processing means for performing, at least, a part of data processing function to be performed for data read out from the storage medium, which are detachably connected to an arithmetic processing unit having a CPU taking the result of the part of processing the data for performing the remaining part of processing the data.

10. The external memory storage according to claim 9, wherein the data read out from the storage medium is a coded and compressed data, and the data processing means has a function for performing, at least, a part of decoding processing corresponding to the coding.

11. The external memory storage according to claim 10, wherein the data read out from the storage medium is the data of binary digital codes coded by at least run length coding.

12. The external memory storage according to claim 10, wherein the data read out from the storage medium is the data of binary digital codes coded by run length coding, and further coded by Huffman's coding.

13. The external memory storage according to claim 12, wherein the data processing means has, at least, a Huffman's decoding function corresponding to the Huffman's coding.

14. The external memory storage according to claim 13, wherein the data processing means further has a Huffman's decoding table and outputs the Huffman's decoded run data and run length data for the data, by using the data stored in the storage medium as an address.

15. An information processing system comprising:

an arithmetic processing unit and an external memory storage including a storage medium for storing data compressed by coding, the arithmetic processing unit and the external memory storage being detachably connected, the arithmetic processing unit having, a CPU for outputting an address code indicating an address area for storing the compressed data to a CPU address bus, a main control section for detecting an address code sent from the CPU, a run length counter, and a run data register; and the external memory storage having, a ROM address counter on which the initial address code position corresponding to an address area storing the compressed data in the storage medium is set, when the main control section detects the address code, a shift register in which the compressed data read from the address position of the storage medium corresponding to the address code set in the ROM address counter is set for sequentially shifting and outputting the compressed data, a ROM read control section for controlling to forward the initial address code position set to the ROM address counter one by one;

a shift register control section for controlling the shift operation of the shift register, and a decoding table for using the output of the shift register as an address and outputting the run length and run data corresponding to the address, wherein the run length outputted from the decoding table is set to the run length counter and the run data is set to the run data register with control of the main control section, and the run data register sends the set run data to the CPU, while the run length counter subtracts the set run length one by one until the set run length becomes 0.

16. An information processing system according to claim 15, wherein the compressed data is obtained by performing run length coding for a hexadecimal code represented by each 2 bits of the binary digital code and further performing Huffman's coding for the run length code.

17. An information processing system according to claim 16, wherein the decoding table is a Huffman's decoding table for outputting the Huffman's decoding run data and run length data corresponding to the Huffman's coding.

18. An information processing system according to claim 17, wherein the Huffman's decoding table has a Huffman's decoding table for run length and a Huffman's decoding table for run data;

the Huffman's decoding table for run length outputs the Huffman's coding length for run length and the decoded data for run length; and the Huffman's decoding table for run data outputs the Huffman's coding length for run data and the decoded data for run data.

19. An information processing system according to claim 18, further comprising:

a first multiplexor and a second multiplexor;

wherein the first multiplexor outputs the Huffman's code length for run length and the Huffman's code length for run data, alternately, and the second multiplexor outputs the decoded data for run length and the decoded data for run data alternately.

20. An information processing system comprising:

an arithmetic processing unit and an external memory storage;

the arithmetic processing unit and the external memory storage being detachably connected, and the external memory storage having, a CD-ROM for storing the data compressed by coding and a decoder on the side of a cartridge for storing the decoding table corresponding to the data coding, and the arithmetic processing unit having, a CD driver for reading the data stored in the CD-ROM;

a CD controller for performing the error correction of CD-ROM standard to the read data, and a decoder on the side of the arithmetic processing unit for decoding the error corrected data from the CD controller referring to the decoding table of the decoder on the side of the cartridge.

21. An information processing system according to claim 20, wherein the decoder on the side of the cartridge and the decoder on the unit side are detachably connected by a connector and the CD-ROM and CD driver are connected by a laser light.

22. A cartridge for use with a main data processing unit comprising:

means for detachably connecting to said main data processing unit;

means for storing and retrieving compressed data, said compressed data being restorable to an original binary data using first and second data decoding processes; and means for carrying out said first data decoding process, wherein said second data decoding process is left to be carded out by said main data processing unit.

23. The cartridge as recited in claim 22 wherein said compressed data comprises Huffman's decoded data and said first data decoding process comprises converting said Huffman's decoded data into run length data and run data.

24. The cartridge as recited in claim 23 wherein said means for storing and retrieving compressed data comprises a CD ROM and data bus connecting said ROM to a read out control unit.

25. The cartridge as recited in claim 22 further comprising a shift register for controlling the output of the run data, said shift register receiving control instructions from said main data processing unit based on said run length data output from said cartridge to said main data processing unit.

26. A data information storage and decoding system comprising:

a main data processing unit comprising:

means for detachably receiving a data cartridge;

means for transmitting a data readout request to said data cartridge;

second stage data decoding means for receiving a first stage decoded data and converting said data to uncompressed binary data, and communicating said uncompressed binary data to a central processing unit; and a data cartridge comprising:

storage means for storing compressed data;

means for reading out requested compressed data according to said data readout request;

first stage data decoding means for receiving said requested compressed data and converting said requested compressed data into first stage decoded data; and means for communicating said first stage decoded data to said second stage decoding means of said main data processing unit.

27. The date information and decoding system as recited in claim 26 wherein said first stage decoding means comprises Huffman's decoding method.

28. The data information and decoding system as recited in claim 27 wherein said second stage data decoding means comprises converting run length data and run data into uncompressed binary data.

* * * * *